US010098335B2

(12) United States Patent
Cooper

(10) Patent No.: US 10,098,335 B2
(45) Date of Patent: Oct. 16, 2018

(54) INSULATED CONTAINER JACKET AND CONTAINER SYSTEM

(71) Applicant: Uncle JJ Enterprises, LLC, Satellite Beach, FL (US)

(72) Inventor: J. J. Cooper, Satellite Beach, FL (US)

(73) Assignee: Uncle JJ Enterprises, LLC, Satellite Beach, FL (US)

( * ) Notice: Subject to any disclaimer, the term of this patent is extended or adjusted under 35 U.S.C. 154(b) by 255 days.

(21) Appl. No.: 14/926,362

(22) Filed: Oct. 29, 2015

(65) Prior Publication Data

US 2016/0120162 A1    May 5, 2016

Related U.S. Application Data

(60) Provisional application No. 62/073,001, filed on Oct. 30, 2014.

(51) Int. Cl.
*A01K 97/05* (2006.01)
*A01K 97/04* (2006.01)
*A45C 11/20* (2006.01)

(52) U.S. Cl.
CPC .............. *A01K 97/04* (2013.01); *A01K 97/05* (2013.01); *A45C 11/20* (2013.01)

(58) Field of Classification Search
CPC ........ A01K 97/04; A01K 97/05; A01K 97/06; A01K 97/22
USPC ......... 43/54.1, 55, 56; 62/457.7, 457.1, 371; 220/592.2, 592.24
See application file for complete search history.

(56) References Cited

U.S. PATENT DOCUMENTS

| | | | | |
|---|---|---|---|---|
| 372,233 A * | 10/1887 | Northrop | ............... | A01K 97/05 43/56 |
| 517,652 A * | 4/1894 | Mann | ...................... | A01K 61/54 119/234 |
| 523,470 A * | 7/1894 | Hemp et al. | ........... | A01K 97/05 43/56 |
| 706,407 A * | 8/1902 | Hall | ........................ | A01K 97/05 43/56 |
| 1,127,522 A * | 2/1915 | Rowe | ..................... | A01K 97/05 43/56 |
| 1,579,560 A * | 4/1926 | Moore | ...................... | F25D 7/00 312/31.03 |
| 2,007,326 A * | 7/1935 | Carpenter | .............. | A01K 97/05 43/56 |
| 2,573,109 A * | 10/1951 | Renfro, Sr. | ............ | A01K 97/05 43/56 |
| 2,603,028 A * | 7/1952 | Roberts | ................... | A01K 97/20 297/188.09 |

(Continued)

FOREIGN PATENT DOCUMENTS

| | | | | |
|---|---|---|---|---|
| FR | 2744592 A1 * | 8/1997 | ............. | A01K 97/05 |
| GB | 2381188 A * | 4/2003 | ............. | A01K 97/04 |

(Continued)

*Primary Examiner* — Darren W Ark
(74) *Attorney, Agent, or Firm* — Beusse Wolter Sanks & Maire; John DeAngelis

(57) ABSTRACT

A system for use with a container having a container lid. The system comprises a jacket further comprising insulated jacket sidewall surfaces shaped to surround one or more side surfaces of the container when the container is enclosed within the jacket, one or more attachment components affixed to an external surface of the one or more jacket sidewall surfaces, and a jacket lid for receiving therewithin the container lid, the jacket lid for affixing to the one more jacket sidewall surfaces to thereby close the container.

10 Claims, 3 Drawing Sheets

(56) References Cited

U.S. PATENT DOCUMENTS

| | | | | |
|---|---|---|---|---|
| 2,610,757 A | * | 9/1952 | Irvine | B65D 81/3886 220/495.03 |
| 2,734,305 A | * | 2/1956 | Hannah | A01K 97/05 43/56 |
| 2,781,937 A | * | 2/1957 | Piker | B65D 25/04 220/592.2 |
| 2,837,860 A | * | 6/1958 | Norling | A01K 97/05 220/9.2 |
| 2,857,949 A | * | 10/1958 | Ziff | A45C 11/20 383/110 |
| 2,912,785 A | * | 11/1959 | Nudell | A01K 97/05 220/8 |
| 2,954,891 A | * | 10/1960 | Imber | B65D 81/3834 220/592.2 |
| 2,963,814 A | * | 12/1960 | Zabrocki | A01K 97/05 43/56 |
| 3,136,087 A | * | 6/1964 | Seroggins | A01K 63/02 43/57 |
| 3,452,469 A | * | 7/1969 | White | A01K 97/04 43/55 |
| 3,603,019 A | * | 9/1971 | Smeltzer | A01K 97/10 220/694 |
| 3,751,845 A | * | 8/1973 | van Leeuwen | A01K 97/05 206/542 |
| 3,831,310 A | * | 8/1974 | Frangullie | A01K 97/05 43/56 |
| 4,198,776 A | * | 4/1980 | Tomita | A01K 97/05 43/56 |
| 4,228,894 A | * | 10/1980 | Lyles | A01K 97/22 190/12 A |
| 4,295,680 A | * | 10/1981 | Grasso | A01K 97/22 190/11 |
| 4,505,386 A | * | 3/1985 | Abrahamson | A01K 97/06 206/315.11 |
| 4,513,525 A | * | 4/1985 | Ward | A01K 97/05 43/55 |
| 4,757,636 A | * | 7/1988 | Lambourn | A01K 97/05 43/57 |
| 4,765,472 A | * | 8/1988 | Dent | A47J 47/18 206/373 |
| 4,787,169 A | * | 11/1988 | Maxfield | A01K 97/05 43/57 |
| 4,845,881 A | * | 7/1989 | Ward | A01K 97/22 43/21.2 |
| 4,864,769 A | * | 9/1989 | Sandahl | A01K 97/05 220/23.89 |
| 4,993,551 A | * | 2/1991 | Lindsay | B25H 3/00 150/161 |
| 5,077,932 A | * | 1/1992 | Hetherington | A01K 63/042 261/121.2 |
| 5,125,183 A | * | 6/1992 | Tisdell | A01K 97/06 43/54.1 |
| 5,170,516 A | * | 12/1992 | Davison | A47K 11/00 297/188.09 |
| 5,305,542 A | * | 4/1994 | Phelps | A01K 97/05 43/21.2 |
| 5,318,821 A | * | 6/1994 | Bradley, Jr. | B65D 25/34 150/154 |
| 5,319,877 A | * | 6/1994 | Hagan | A01K 97/05 43/54.1 |
| 5,403,095 A | * | 4/1995 | Melk | A45C 11/20 220/23.87 |
| 5,407,107 A | * | 4/1995 | Smith | B65D 47/265 222/548 |
| 5,429,265 A | * | 7/1995 | Maire | B25H 3/00 206/372 |
| 5,586,406 A | * | 12/1996 | Lin | A01K 97/04 43/55 |
| 5,586,805 A | * | 12/1996 | Rinehart | A01K 97/22 206/216 |
| 5,634,291 A | * | 6/1997 | Pham | A01K 97/05 43/56 |
| 5,659,995 A | * | 8/1997 | Hoffman | A01K 97/06 220/504 |
| 5,755,057 A | * | 5/1998 | Dancer | A01K 97/06 206/315.11 |
| 5,799,435 A | * | 9/1998 | Stafford | A01K 97/05 261/121.2 |
| 5,970,651 A | * | 10/1999 | Torkilsen | A01K 97/01 206/315.11 |
| 6,073,387 A | * | 6/2000 | Torkilsen | A01K 97/01 206/315.11 |
| 6,357,169 B1 | * | 3/2002 | Gouge | A01K 97/05 220/263 |
| D465,732 S | * | 11/2002 | Kick | D9/500 |
| 6,578,726 B1 | * | 6/2003 | Schaefer | B65D 47/265 215/387 |
| 6,729,066 B1 | * | 5/2004 | Howley | A01K 97/05 43/54.1 |
| 6,886,291 B1 | * | 5/2005 | Jaggers | A01K 97/05 43/55 |
| 6,938,761 B2 | * | 9/2005 | Nish | A45C 3/00 206/315.11 |
| 6,990,765 B1 | * | 1/2006 | Beech | A01K 97/05 43/55 |
| 7,017,297 B1 | * | 3/2006 | Ward | A01K 97/20 43/55 |
| 7,153,025 B1 | * | 12/2006 | Jackson | A45C 7/0059 224/246 |
| 7,219,465 B2 | * | 5/2007 | Beech | A01K 97/05 43/55 |
| 7,377,071 B1 | * | 5/2008 | Thompson | A01K 97/05 43/56 |
| 7,644,535 B2 | * | 1/2010 | Sloop | A01K 97/05 43/56 |
| 7,946,250 B2 | * | 5/2011 | Holms | A01K 63/006 119/245 |
| 8,215,515 B2 | * | 7/2012 | Churchill | A47G 23/02 220/560 |
| 8,251,269 B2 | * | 8/2012 | Winneur | A45C 9/00 224/629 |
| 8,607,498 B1 | * | 12/2013 | Smith | A01K 97/05 43/56 |
| 8,615,921 B1 | * | 12/2013 | Weems | A01K 97/05 220/592.2 |
| 8,806,803 B1 | * | 8/2014 | Mitchell | A01K 97/06 206/315.11 |
| 9,814,225 B2 | * | 11/2017 | Myers | A01K 97/04 |
| 9,974,392 B1 | * | 5/2018 | Bruning | A47C 7/748 |
| 2002/0020104 A1 | * | 2/2002 | Kolar | A01K 97/05 43/55 |
| 2002/0079339 A1 | * | 6/2002 | Sheffler | B65D 47/265 222/480 |
| 2005/0279014 A1 | * | 12/2005 | Beech | A01K 97/05 43/55 |
| 2006/0016119 A1 | * | 1/2006 | Ashburn, Jr. | A01K 97/05 43/56 |
| 2006/0277814 A1 | * | 12/2006 | Lucky | A01K 97/08 43/21.2 |
| 2007/0205234 A1 | * | 9/2007 | Lessmann | A45F 3/04 224/155 |
| 2007/0261977 A1 | * | 11/2007 | Sakai | A01K 97/06 206/315.11 |
| 2008/0028667 A1 | * | 2/2008 | Grzybowski | A01K 63/02 43/57 |
| 2012/0110890 A1 | * | 5/2012 | Garrett | A01K 71/00 43/55 |
| 2013/0340318 A1 | * | 12/2013 | Morici | A01K 97/20 43/55 |
| 2016/0021861 A1 | * | 1/2016 | Pippins | A01K 97/06 43/17.5 |

FOREIGN PATENT DOCUMENTS

| | | | |
|---|---|---|---|
| JP | 2005204552 A | * | 8/2005 |
| KR | 20130043403 A | * | 4/2013 |

* cited by examiner

INSULATED CONTAINER JACKET AND CONTAINER SYSTEM

CROSS REFERENCE TO RELATED APPLICATIONS

This patent application claims the benefit of U.S. provisional patent application filed on Oct. 30, 2014 and assigned Application No. 62/073,001, incorporated herein in its entirety.

FIELD OF THE INVENTION

An insulated jacket for use with a container and an insulated container system for storing and transporting items in an insulated environment.

BACKGROUND OF THE INVENTION

One application for the present invention is for carrying live fishing bait. Most live bait buckets available on the market today are not well insulated. This creates a problem for a user during hot and cold weather. During these weather conditions the bait contained within the bucket can become lethargic due to exposure to temperature extremes. On some occasions the bait may die due to the rapid heating or cooling of the water in which the bait are stored.

The live bait buckets on the market that provide insulation utilize relatively inexpensive Styrofoam insulating material that can be easily distorted or broken. Further, since the insulating material is disposed on inside surfaces of the bucket, it displaces a large amount of the bucket volume, which greatly reduces the amount of water and therefore bait that the user can store within the bucket.

None of the live bait buckets currently available provide sufficient external storage pockets, hooks, etc. for storing fishing-related equipment; i.e. hooks, weights, bait knives, fishing rods etc.

As those skilled in the art are aware, when live bait buckets are full they generally weigh in excess of 20 lbs. All of the current bait buckets utilize a small handle that makes them difficult to carry beyond short distances.

Also, none of the existing live bait bucket are structurally rigid to serve as a seat for a user without the risk of injury and/or damage to the bait bucket, its contents, or the user. The existing bait buckets are generally constructed of relatively soft or fragile material that cannot support an individual's weight. Thus the bait bucket cannot be used as a stool for sitting. The live bait bucket lids that are currently available are uninsulated and flimsy, preventing them from supporting the weight of an average adult human.

Further, none of the current live bait buckets offer adjustable input/output ports or openings for use with an aeration system or for draining the bucket contents.

None of the current live bait buckets lend themselves to alternative uses (such as a hard-sided cooler or a soft-sided cooler, grilling apparatus, gardening apparatus, construction apparatus, etc.).

BRIEF DESCRIPTION OF THE FIGURES

The forgoing and other features of the present invention will be apparent to one skilled in the art to which the present invention relates upon consideration of the description of the invention with reference to the accompanying drawings. The use of the same reference numeral in the various figures refers to the same element.

DETAILED DESCRIPTION OF THE INVENTION

Before describing in detail the particular systems and apparatuses related to an insulated container jacket and container system, it should be observed that the present invention resides primarily in a novel and non-obvious combination of elements. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The presented embodiments are not intended to define limits as to the structures, elements or methods of the inventions, but only to provide exemplary constructions. The embodiments are permissive rather than mandatory and illustrative rather than exhaustive.

Although described In the context of a bait bucket application, the invention can also serve as an insulated jacket for use with a container for storing and transporting any item that is best preserved in an insulated environment.

In one embodiment the inventive jacket is usable with any standard three, five or seven gallon bucket. The bucket or container is received within the insulative jacket (also referred to as an outer covering, shell, and insulated outer container cover) that also serves as a protective enclosure for the container.

Since this invention locates the insulating component on an outside surface of the container, maximum volume is maintained in the interior region of the container for storage of bait or one or more other items. In one embodiment the outer covering or jacket is constructed of a water-resistant and abrasion-resistant industrial fabric with a foam core that provides the insulation feature.

Figure 1:
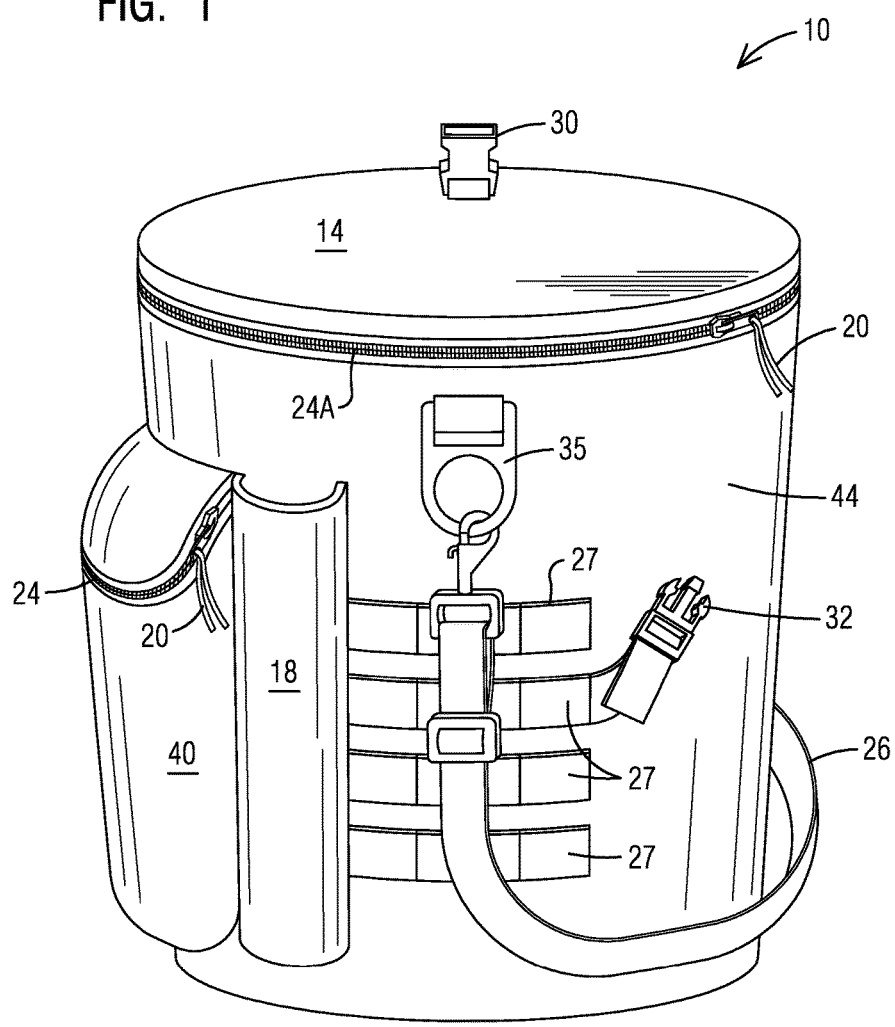
FIG. 1 illustrates a first view of a jacket or cover according to the present invention.

FIG. 1 illustrates a jacket 10, and its many components. The container is enclosed within the jacket 10, but is not visible in FIG. 1. A jacket lid 14 for enclosing a container lid (as described below) is shown in its closed position. Also depicted are pockets 18 formed in an outer surface of the jacket 10. The pockets 18 can serve as convenient fishing rod holders when the container system is employed as a bait bucket. Certain pockets are closed by zippers (obscured from view in FIG. 1) and leather zipper pulls 20 are attached to one or more zippers 24 to make opening and closing of the zipper easier.

A removable and adjustable shoulder strap 26 and military style MOLLE (Modular Light weight Load Carrying Equipment) attachment straps 27 are also affixed to the external surface of the jacket 10.

Preferably the zipper 24A and seal at the interface between the jacket lid 14 of the container jacket and the side surfaces of the jacket are water resistant to keep liquids from entering or flowing out from the container.

In FIG. 1 the jacket lid 14 is shown in a closed position. After opening the jacket lid it can be locked into an open position by engaging a first lid clip 30 (see FIG. 1) attached to the jacket lid 14 with a second lid clip 32 attached to a side surface of the jacket 10.

As can be seen the invention provides numerous alternative pockets, attachment points and "MOLLE" style straps or webbing for carrying any equipment and items associated with use of the container system.

The jacket 10 comprises two attachment points 35 and 37 for attaching the shoulder strap 26 to the exterior surface of the jacket 10. See FIGS. 1 and 2. The shoulder strap can be used alone in conjunction with a container handle, which is not visible in FIGS. 1 and 2. Access to the container handle when the jacket 10 is in place and use of the alternative shoulder strap 26 makes it considerably easier for the user to transport the container, especially when the container is used to carry heavy objects, such as bait and water.

Figure 2:
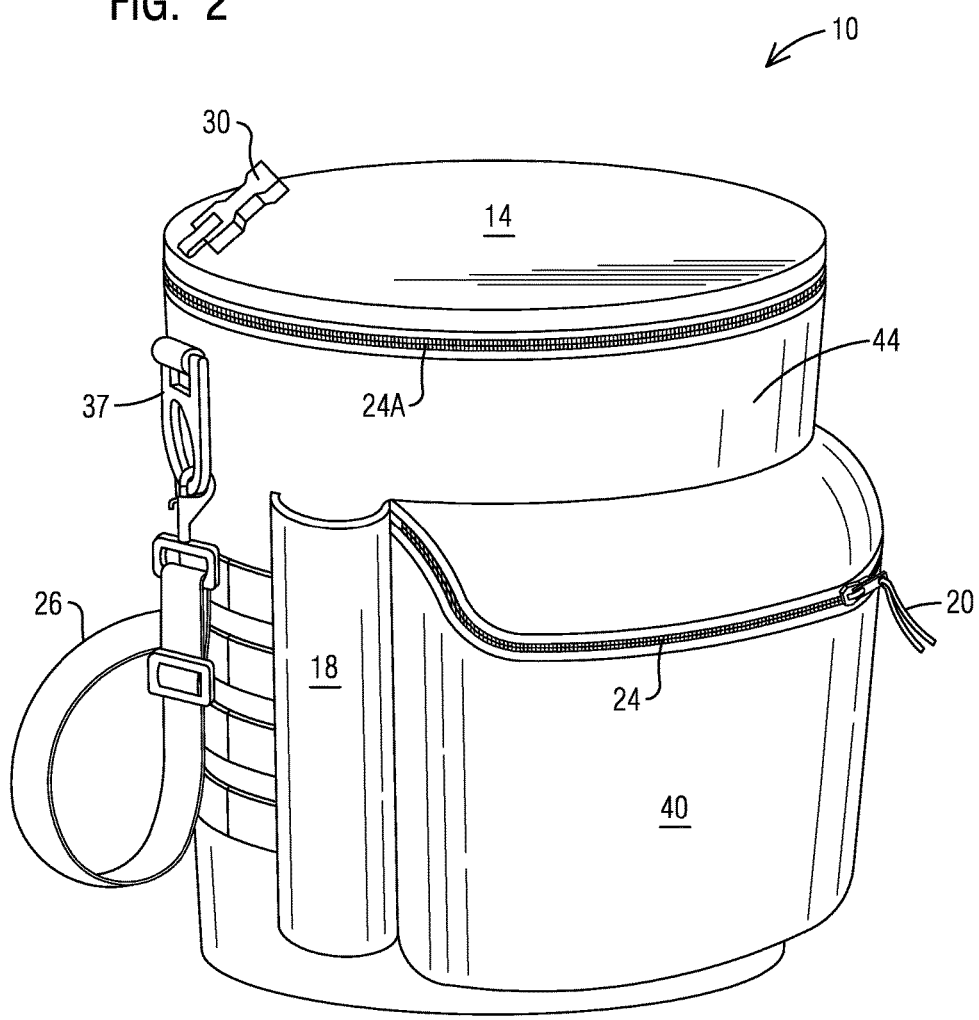
FIG. 2 illustrates a second view of a jacket or cover according to the present invention.

FIG. 2 also illustrates a relatively large cargo pocket 40 on an external surface of the jacket.

Although FIGS. 1 and 2 illustrate the jacket 10 being without a pattern, the jacket 10 may have a camouflage pattern, though such a pattern is not required. The user can select any desired pattern for the jacket 10.

Figure 3:
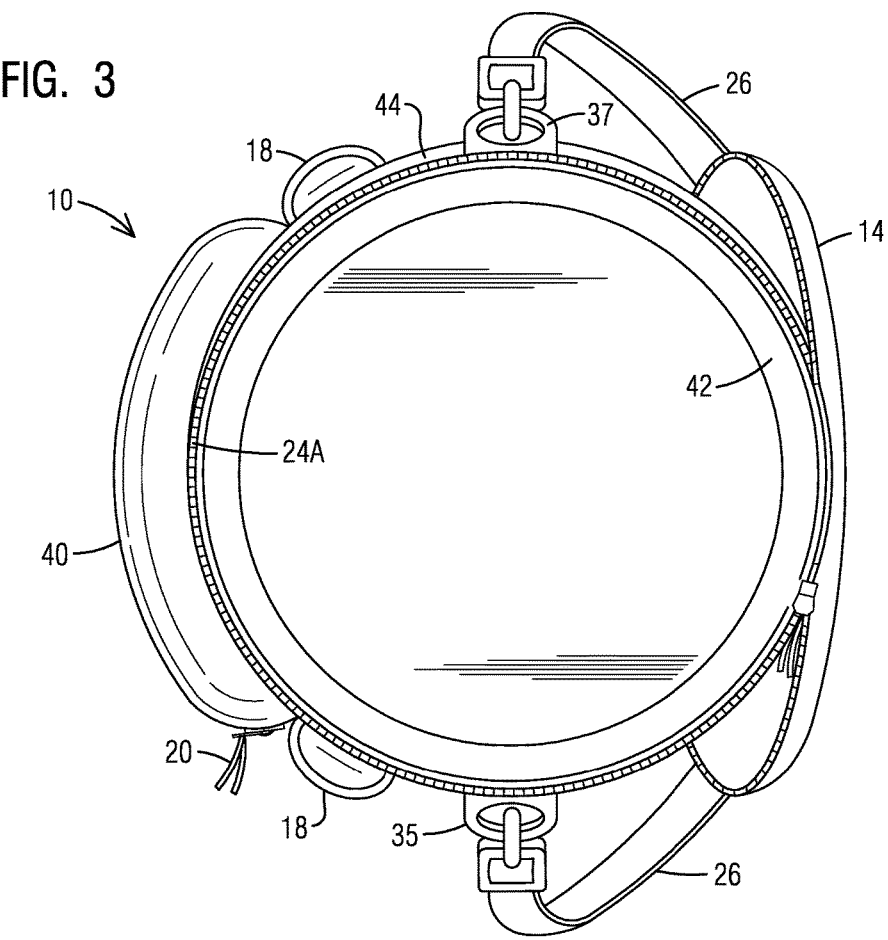
FIG. 3 illustrates an interior of the jacket or cover.

FIG. 3 illustrates an interior of the jacket 10 comprising a water-proof liner 42. Side surfaces of the jacket 10 comprise a sturdy insulating material (not visible) disposed between the liner 42 and an outer material layer 44 of the jacket side surfaces.

FIG. 3 illustrates the lid 14 in an open configuration.

Figure 4:
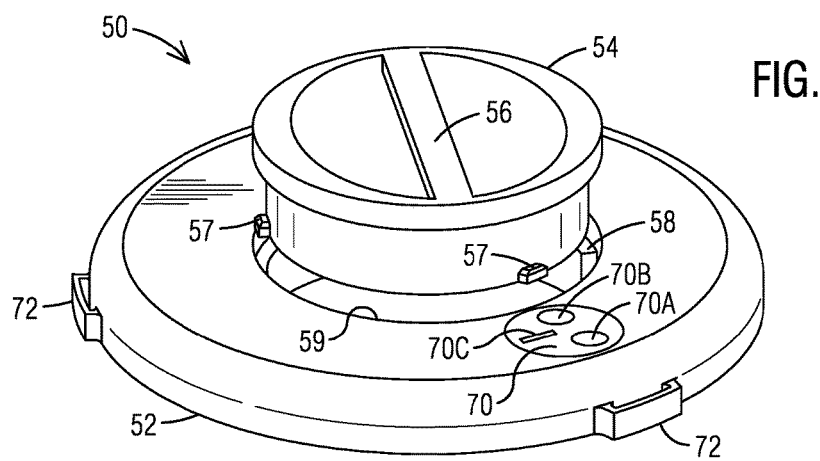
FIG. 4 illustrates a container lid.

FIG. 4 illustrates a container lid 50 for closing the container. The jacket 10 comprises a jacket lid 14 as described above, for receiving the container lid 50 and thereby closing and insulating the container. FIGS. 1 and 2 illustrate the jacket lid although the container lid is not visible in those Figures.

In one embodiment the container lid 50 is constructed of an industrial strength molded plastic. The container lid 50 comprises a circumferential snap ring 52 that securely fits onto the container rim of any standard three, five, or seven gallon bucket or container and serve as a seat as it can easily support the weight of a large adult The container lid 50 includes an access hatch 54 located in a central region of the lid 50 as illustrated in FIG. 4. The access hatch comprises a locking handle 56 for turning the hatch and a locking/unlocking mechanism for locking/unlocking the hatch by action of locking lugs 57 (only one visible in FIG. 4) against a proximate surface of the lid, i.e., against a lug guide rail 58. This locking/unlocking mechanism is designed to be operated with one hand thereby permitting easy removal of the hatch when in the unlocked configuration. With the hatch removed, the user can gain access to the container interior through an access hatch opening 59.

The lid further comprises an integrated rotatable disc 70 having multiple disc openings 70A, 70B, and 70C therein. See FIG. 4. The disc 70 is positioned over an opening in the lid (referred to as a lid opening) and thus the user can position any one of the disc openings 70A, 70B, and 70C over the lid opening. This allows the user to select one of the disc openings to provide a flow path from the container interior, through the lid opening and then through the selected disc opening.

In one embodiment the rotatable disc 70 defines two differently sized and shaped openings and thus the disc can be placed in one of three different positions as follows: (1) a closed position, (2) a relatively large opening to accommodate an air line extending from an aerator into the interior of the bait bucket (the aerator is not illustrated in FIGS. 4), and (3) multiple small holes to allow the user to drain melted ice or, in an embodiment in which the container comprises a bait bucket, to strain dirty bait water to free space for adding cleaner bait water. Liquid can be drained from the container through these multiple small holes without dumping the contents of the container.

The aerator circulates air within the fluid in the container. The aerator, or another accessory, can be attached to the container at an attachment clip 72.

One of the advantages of the present invention over known alternatives is its transformability from an insulated container system (e.g. a bait bucket system) to an insulated hard-sided cooler or an insulated soft-sided cooler. Additionally the outer surface of the container cover provides for the storage of various implements to be used for a variety of outdoor activities.

A container can be easily withdrawn from the container cover of the present invention. This design allows the user to insert a different container (that does not contain any bait, for example) into the cover. This concept gives the user the opportunity to utilize this invention as a cooler by inserting a clean container into the outer insulating container cover.

The lid of FIG. 4 is replaceable with a lid constructed of the same material or a different material from the container. This feature allows the user to utilize the container cover as a light weight soft-sided cooler, with or without the container

What is claimed is:

1. A system for use with a container, the system comprising:
   a jacket comprising insulated jacket sidewalls shaped to surround the container when the container is enclosed within the jacket;
   one or more attachment components affixed to an external surface of the jacket sidewalls;
   a container lid;
   a jacket lid for receiving the container lid, the jacket lid for affixing to the jacket sidewalls to thereby close the jacket around the container;
   the container lid defining an access hatch opening and a lid opening therein, the access hatch opening concentric relative to the container lid, the lid opening located between an outer circumference of the access hatch opening and a circumferential edge of the container lid, the access hatch opening and the lid opening in fluid communication with an interior volume of the container when the container lid is secured to the container;
   a rotatable disc disposed over the lid opening, the disc defining two or more differently-sized disc openings therein, each one of the disc openings for separately aligning with the lid opening to drain contents from within the interior volume of the container through an aligned disc opening.

2. The system of claim 1 wherein the one or more attachment components comprises pockets or straps.

3. The system of claim 1 wherein the jacket sidewalls comprise an insulating material disposed between an inner liner and an outer material layer.

4. The system of claim 1 further comprising a shoulder strap for affixing to opposing locations on the jacket sidewalls.

5. The system of claim 1 wherein a zipper affixes the jacket lid to the jacket sidewalls for use in closing the jacket.

6. The system of claim 1 wherein the container comprises a bait bucket.

7. The system of claim 1 wherein the container lid further comprises a ring mechanism disposed around a perimeter of the container lid for attachment to a container rim.

8. The system of claim 1 further comprising a hatch lid further comprising a manual locking mechanism for locking the hatch lid to the container lid, manual operation of the hatch lid for manually closing and opening the hatch opening.

9. The system of claim 1 wherein one of the disc openings for receiving an aerator hose for use in aerating fluid within the container.

10. The system of claim 1 wherein a material of the container lid comprises a rigid material.

\* \* \* \* \*